United States Patent
Jespersen

(10) Patent No.: US 6,947,851 B2
(45) Date of Patent: Sep. 20, 2005

(54) TRANSCEIVER CIRCUIT FOR AN ULTRASONIC FLOWMETER

(75) Inventor: Lars Jespersen, Soenderborg (DK)

(73) Assignee: Siemens Flow Instruments A/S, Nordborg (DK)

( * ) Notice: Subject to any disclaimer, the term of this patent is extended or adjusted under 35 U.S.C. 154(b) by 0 days.

(21) Appl. No.: 10/831,308

(22) Filed: Apr. 26, 2004

(65) Prior Publication Data

US 2005/0061085 A1 Mar. 24, 2005

Related U.S. Application Data

(63) Continuation of application No. PCT/DK02/00705, filed on Oct. 24, 2002.

(30) Foreign Application Priority Data

Oct. 26, 2001 (DK) ......................................... 200101581

(51) Int. Cl.$^7$ ............................. G06F 19/00; G01F 1/00
(52) U.S. Cl. ..................... 702/45; 702/48; 73/861.18; 73/861.27; 73/861.29; 73/861.31
(58) Field of Search ........................ 73/861.18, 861.25, 73/861.26, 861.27, 861.28, 861.29, 861.31; 702/45, 48, 54; 367/140, 87, 191

(56) References Cited

U.S. PATENT DOCUMENTS

| | | | |
|---|---|---|---|
| 5,105,666 A | | 4/1992 | Steinacher |
| 5,199,299 A | * | 4/1993 | Hughes et al. ................. 73/610 |
| 6,003,385 A | | 12/1999 | De Vanssay et al. |
| 6,050,945 A | * | 4/2000 | Peterson et al. ............ 600/443 |
| 6,051,895 A | * | 4/2000 | Mercier ....................... 307/125 |
| 6,074,346 A | * | 6/2000 | Oppelt ......................... 600/437 |
| 6,083,164 A | * | 7/2000 | Oppelt et al. ................ 600/437 |
| 6,584,861 B1 | * | 7/2003 | Jespersen ................. 73/861.27 |

FOREIGN PATENT DOCUMENTS

| | | |
|---|---|---|
| DE | 198 10 798 A1 | 9/1998 |
| DE | 100 48 959 C2 | 5/2001 |
| DK | 166974 B1 | 8/1993 |
| DK | 168248 B1 | 2/1994 |
| EP | 0 498 141 B1 | 8/1992 |
| WO | WO 94/17371 A1 | 8/1994 |

* cited by examiner

*Primary Examiner*—Patrick J. Assouad
(74) *Attorney, Agent, or Firm*—Sughrue Mion, PLLC

(57) ABSTRACT

A transmitting and receiving circuit for an ultrasonic flowmeter. In such circuits, an ultrasonic transducer is typically used as both transmitter and receiver. This is obtained by using switching means, for example in the form of CMOS switches. However, problems arise with ringings of a transducer when having acted as a transmitter. This unwanted ringing makes the crystal of the transducer act as an additional signal generator, and the signal is coupled via parasitic capacitances in a switching means to the receiving ultrasonic transducer. This problem is solved by connecting one pole of a short circuit switch (S3, S4) to the ultrasonic transducer (TR1, TR2) or to the switching means (S1, S2) and the other pole of the short circuit switch to ground. Keeping the short circuit switch closed when the switching means is open, and open when the switching means is closed, creates a decoupling path for the unwanted signal, thereby improving the accuracy of the transmitting and receiving circuit.

17 Claims, 5 Drawing Sheets

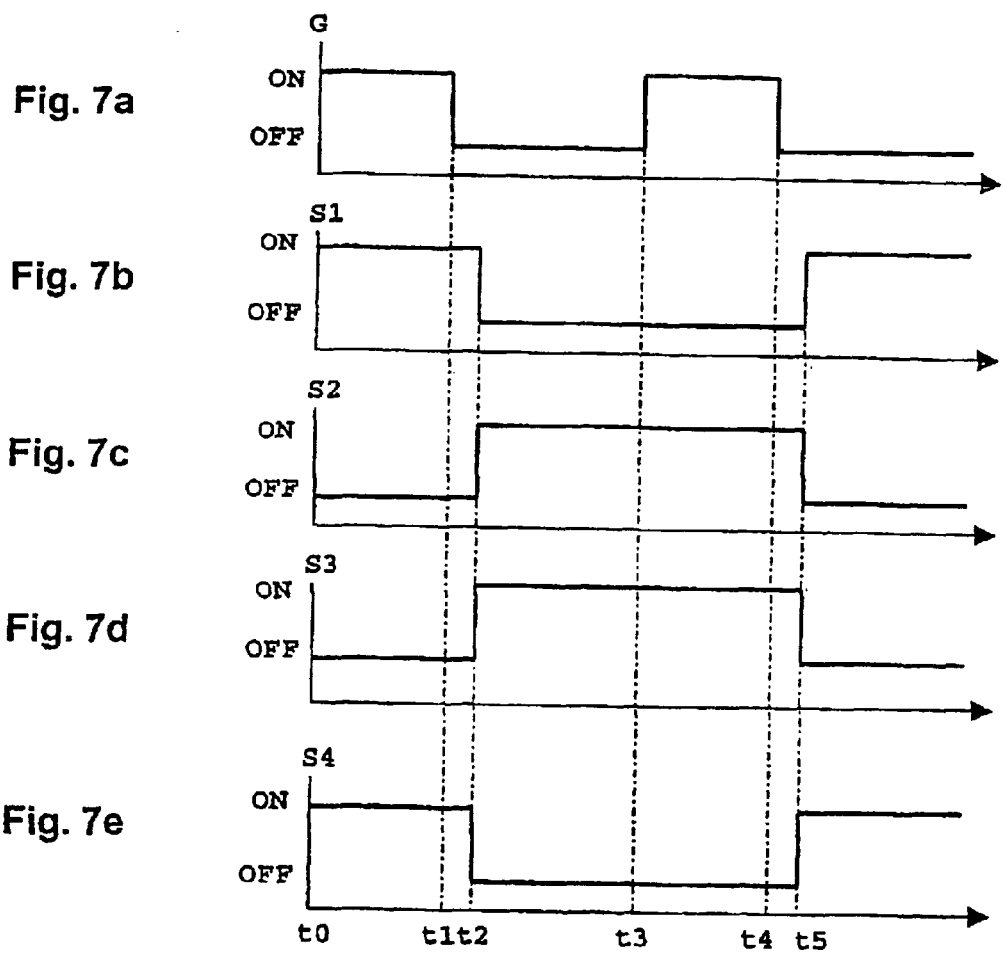

TRANSCEIVER CIRCUIT FOR AN ULTRASONIC FLOWMETER

This is a Continuation of International Application PCT/DK02/00705, with an international filing date of Oct. 24, 2002, which was published under PCT Article 21(2) in German, and the disclosure of which is incorporated into this application by reference.

FIELD OF AND BACKGROUND OF THE INVENTION

The present invention concerns a transmitting and receiving circuit for ultra-sonic flowmeters. The invention relates, particularly, to a transmitting and receiving circuit for an ultrasonic flowmeter, which includes a signal generator; and at least two circuit arrangements, each having a switching means and an ultrasonic transducer.

In such circuits it is known that measuring the very small time differences between the transmission of ultrasound upstream and downstream requires a very high degree of symmetry in the electronic circuits used for transmitting and receiving ultrasonic signals via the transducers, so that the group running time for signals in the electronic circuit itself is the same for both upstream and downstream signal transmission. It is also known that the impedances loading each transducer must be constant from the transmitting situation to the receiving situation. If this is the case, the sensor meets the condition of reciprocity. This means, among other things, that the upstream and down-stream transmission times of the sensor are equal when the medium stands still.

This problem is addressed in WO 94/17371, which describes the use of two identical transmitting and receiving circuits, one for each transducer, which include an amplifier with a first input terminal for connection to an ultrasonic flow transducer, a second input terminal for connection to a signal source, an output terminal for connection to a detection circuit and a feedback connection between the output terminal and the first input terminal. Each of the circuits is able to function as a transmitting circuit or a receiving circuit, and their mode of functioning is alternated by means of a switching arrangement, or by switching both circuits between the transmitting and receiving function to obtain the transmission of ultrasonic signals in both directions. However, variations caused by component tolerances, different temperature coefficients and the like between two such circuits, will still enable both fixed and temperature dependent group running time differences for signals in the electronic circuits.

DK 168 248 B1 discloses a system using separate transmitting and receiving circuits, thus running the risk of group running time differences of upstream and downstream signal transmission, as mentioned above.

The same applies for the system according to DK 166 974 B1, which consequently does not eliminate the problems of group running time differences. Further, these two systems are relatively complex, with several switches and amplifiers.

From DE 100 48 959 A1, filed by the applicant, a transmitting and receiving circuit for two ultrasonic flowmeters is known, which remedies the problems of variations between two such circuits caused by component tolerances, different temperature coefficients and the like, and which, at the same time, provides a simplification of the circuit used. This transmitting and receiving circuit includes two circuit arrangements, each consisting of a serial connection having an ultrasonic transducer and a switching means. The generator signal is led into a first input terminal (positive input terminal) of an amplifier, whereas the switching means are connected to a second input terminal (negative input terminal). In various embodiments, the circuit arrangement is either connected directly with a reference potential or with the amplifier output. This arrangement enables two-way transmission of ultrasonic signals with just one single transmitting and receiving circuit of the kind mentioned, because the switching means alternately connect one of the ultrasonic transducers functionally with the first input terminal. With the arrangement shown, component tolerances, different temperature coefficients, and the like, will be equal for the transmission of ultrasound in the two opposite directions, so that the group running times for signals in the electronic circuit itself are equal for the transmission of ultrasound in the two opposite directions. This applies for both fixed and variable group running time differences, the fixed differences being merely caused by component tolerances, the variable differences being caused by temperature dependent parameters. If the fixed group running time difference is eliminated to zero, zero point calibration/adjustment can be avoided, which reduces fault possibilities and saves time. In order to comply with, for example, authority approvals, the temperature dependent group running time difference must be kept within established limits. When transmitting ultrasonic signals in a first direction, the circuit is connected with the first ultrasonic transducer by means of the switching means, while a signal is transmitted to the transducer and converted to an ultrasonic signal. Subsequently, the circuit is switched to connection with the other ultrasonic transducer for receiving the signal, which will be generated when it receives the ultrasonic signal arriving from the first transducer. When transmitting the ultrasonic signal in the opposite direction, the circuit is first connected with the second transducer for transmission and subsequently with the first transducer for receiving.

With the embodiments described in DE 100 48 959 A1, it has turned out, however, that there is a problem with coupling of the signal from the generator to a receiving transducer and a problem with the decaying time of the transducers. Shortly after an ultrasonic transducer has acted as transmitter, the signal to the transducer is interrupted by a control device via the switching means mentioned above. However, the ultrasonic transducer continues to oscillate for some time after the switching, and this oscillation time depends on the design of the transducer. The transducer consists of a housing, typically of steel, in which the crystal is arranged, and the crystal transmits through a window in the housing. Generally, transducers with thick steel windows tend to oscillate for a longer time period than transducers with thinner windows because the thick window is adapted to the oscillation of the crystal, and the ringing has turned out to couple electrically to the receiving transducer, which causes a falsification of the measuring signal.

In principle, the problem can be solved by using only thin-walled transducers, but thick-walled transducers are preferred; because they are more robust towards eroding effects, the pressure of the medium (also vacuum), cavitation and fluid hammer. The use of thick-walled windows enables a selfbearing design and a design for higher pressures than possible with a relieved piezo ceramic used in the transducer.

DE 198 10 798 A1 teaches a solution for reducing the coupling of the generator signal and for reducing the effects of ringing from the ultra sonic transducer. A short circuit switch is inserted in the receiving circuit and in the transmitting circuit. The short circuit switches are controlled by a control arrangement which guides ringing signals and coupled generator signals to ground. However, the circuit uses separate transmitting- and receiving electronics and, therefore, has two different signal paths for transmitting and receiving signals. Thus, reciprocity is not given automatically, but must be made as described in DE 198 10 798 A1 by implementing an impedance matching network. This increases the complexity of the circuit and further a large number of short circuit-, transmitting- and receiving switches are necessary in order to obtain reciprocity and to reduce the couplings and ringing effects.

OBJECTS OF THE INVENTION

Based on the problem described, one object of the invention is to design a more simple transmitting and receiving circuit for an ultrasonic flowmeter, where the circuit exhibits full reciprocity and is not substantially affected by ringing generated in a decaying period of the ultrasonic transducer. A further object is to reduce the coupling of signal from the signal generator, the signal being meant for the transmitting transducer, but being coupled to the receiving transducer.

SUMMARY OF THE INVENTION

In a transmitting and receiving circuit, these and other objects are solved in that the transmitting and receiving circuit comprises an amplifier receiving on a first input upstream and downstream ultrasonic signals and on a second input a generator signal whereby the amplifier has a negative feedback impedance connected from the amplifier output to its first input, where the circuit arrangement is connected with a second impedance, and where the short circuit switch is connected to an electrical conductor, which conductor carries both transmitting signals and receiving signals.

The invention is based on the recognition that the switch has a parasitic capacitance which is active in the OFF-period of the switch, and which causes the unwanted electrical coupling to the measuring transducer. The capacitance has a magnitude which influences the measuring result, and the capacitance can be considered being connected in parallel with the switching means, while it is closed. When the transducer generates ringings, that is, when the housing is oscillating mechanically in spite of the disconnected signal, the crystal in the transducer generates an electrical signal which is led via the parasitic capacitance in the switching means to the amplifier input and to the receiving transducer. The decaying transducer thus acts as an additional signal generator in the transmitting and receiving circuit.

The invention also solves the other problem, namely an unwanted coupling during the transmitting time of signals from the signal generator meant for the transmitting transducer, but led to the receiving transducer via the capacitance. The coupled signal is decoupled via the closed short circuit switch.

The invention thus provides both full reciprocity and effective decoupling of interfering signals. This is obtained by using only one short circuit switch in each circuit arrangement. The short circuit switch is connected to an electrical conductor which carries both the transmission signal from the amplifier to the ultrasonic transducer, and the receiving signal from the ultrasonic transducer to the amplifier. As opposed to the prior art, only one signal path needs to be decoupled.

Both contributions—the contribution from the ringing of the transducer and the coupling from the generator signal—give rise to a time displacement of the measuring signal, and the longer the decaying time of the transducers, the heavier the demands on the isolation of the switching means in the closed state.

Advantageously, each circuit arrangement comprises a first and a second series connection, which substantially consist of the switching means and the ultrasonic transducer. It has turned out to be particularly expedient to use the invention in circuit arrangements that include series connections of ultrasonic transducer and switching means. By connecting the short circuit switch to the series connection of ultrasonic transducer and switching means, it is possible both to short-circuit the unwanted generator voltage originating from the crystal and to disconnect the signal path through the parasitic capacitance. As mentioned, this is done by opening the short circuit switch for the whole or parts of the period, during which the ultrasonic transducer corresponding to the switch has to be inactive, that is, generate no ultrasonic signals.

The short circuit switch has two poles, the first pole on a first switch being electrically connected to the first series connection, and a first pole on a second short circuit switch being electrically connected to the second series connection.

Advantageously, the first pole of the short circuit switch is connected to one of the poles of the switching means, as this gives an efficient decoupling of the signal coupled through the parasitic capacitance. The question of the connection point is of particular importance, if an impedance is inserted in the series connection between the ultrasonic transducer and the switching means. In this case, connection of the first pole of the short circuit switch to the pole of the switching means is preferred to connection to the ultrasonic transducer pole.

In one end the series connections can be connected to the free end of the second impedance, while in the other end they are connected to a reference potential. As mentioned above, connecting one pole of the short circuit switch in the midpoint between the one pole of the switching means and one transducer pole causes an efficient decoupling, as the one coupling path from signal generator to receiving transducer (signal generator is transmitting), and the other coupling path from the ringing transmitting transducer to the receiving transducer (signal generator is silent) are decoupled.

In an alternative embodiment of the invention, the series connections are connected in parallel with the feedback impedance, and one pole of a short circuit switch is electrically connected to the midpoint between the ultrasonic transducer and switching means corresponding to the short circuit switch.

In a further alternative embodiment of the invention, the second impedance is divided into two serial impedances, each inserted in a series connection between the switching means and the ultrasonic transducer. The serial impedance then acts as a load upon the ultrasonic transducer, and by selecting a suitable impedance size, the ringing signal will decay faster.

In this embodiment, the short circuit switch could be arranged in parallel with the ultrasonic transducer, but the effect is better if one of its poles is connected to the center between the serial impedance and the switching means, as the coupled generator signal sees a larger impedance. Selecting the connection point of the short circuit switch is, however a design question, and depends on the ratio of the magnitude of the signal originating from the ringing and the magnitude of the coupled generator signal.

The switching means can be made up of two series connected switches with a third switch connected between the common connecting point of the two switches and the reference point. The advantage of this is that the damping is increased because the unwanted signal has to pass two parasitic capacitances, their midpoint being decoupled to a reference point.

With regard to the voltage potential, the reference point is advantageously placed on ground or virtual ground, but can, however, also be a direct voltage level.

In order to block a direct voltage, which is applied on the circuit arrangements and is ensuring the supply of a working voltage to the switching means, a capacitor can be inserted in series with a short circuit switch.

Even though the optimum damping effect is obtained in a circuit arrangement comprising a series connection of switching means and ultrasonic transducer, the invention can also be used where the transducers are connected differently. This particularly applies for the type of transmitting-receiving circuits, in which two ultrasonic transducers are arranged in a first series connection and the two switching means are arranged in a second series connection, the two series connections being arranged in parallel and electrically connected with each other in the midpoint between the first series connection and the second series connection. According to the invention, a short circuit switch can here be arranged in series with each transducer, but the circuit does not decouple the generator signal through the parasitic capacitance of the switching means, like the circuits described above do.

For controlling the opening and closing times of both switching means and short circuit switches, it is expedient to have the same control device control the sequence course. An ASIC or a microcontroller can be used as control device.

BRIEF DESCRIPTION OF THE DRAWINGS

In the following detailed part of the present description, the invention is explained with reference to embodiments of a transmitting and receiving circuit for ultrasonic flowmeters according to the invention, as shown in the drawings:

FIG. 7 a sequence diagram of the switch positions according to the embodiment in FIG. 4.

DETAILED DESCRIPTION OF THE PREFERRED EMBODIMENTS

Figure 1:
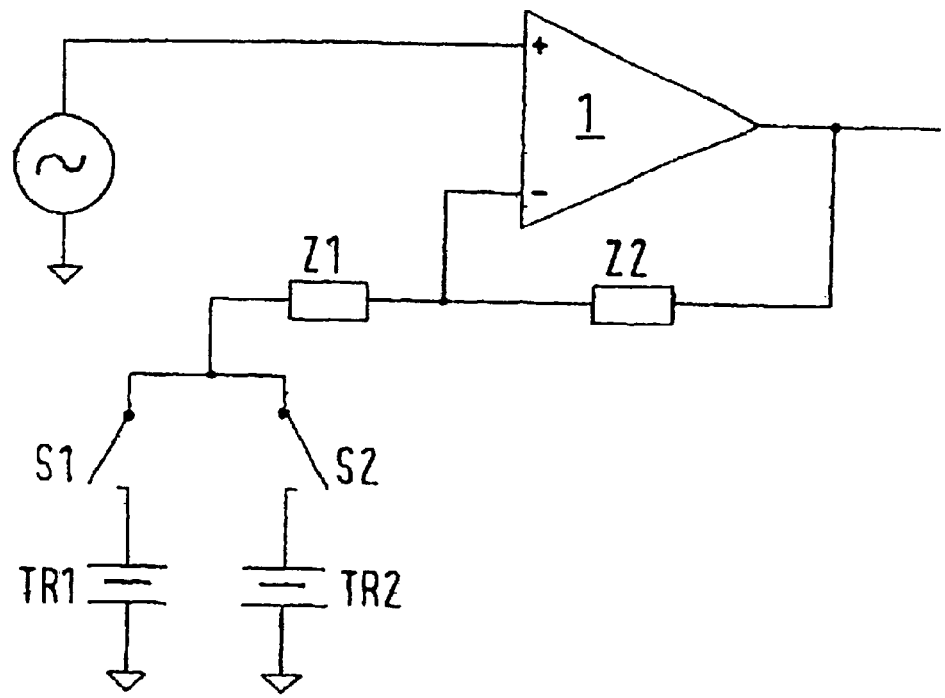
FIG. 1 an outline of a transmitting and receiving circuit for ultrasonic flowmeters from the state of the art, both ultrasonic transducers having one terminal connected to a reference potential and the other terminal connected to the first input terminal on the amplifier via a switching means.

The transmitting and receiving circuit shown in FIG. 1 includes an amplifier 1 with a first, inverting input terminal for connection with an ultrasonic transducer TR1, TR2, the connection being established via an impedance Z1 and switching means S1, S2. S1 and TR1 here form a first series connection, whereas S2 and TR2 form a second series connection. The second, non-inverting input terminal is connected with a signal source, producing in a controlled manner electrical signals for transmission to the ultrasonic transducers TR1, TR2. A feedback connection is established between the output terminal and the inverting input terminal via an impedance Z2. The output terminal of the amplifier 1 is also connected with (not shown) detection means for the derivation of transit time measurements used for the calculation of the desired measured flow.

The circuit shown functions as follows:

During transmission from TR1 to TR2, S1 is closed, and the signal source supplies the circuit with a suitable electrical signal, which is transmitted to the transducer TR1 via the amplifier 1, the impedances Z1 and Z2 and the switch S1. The generator signal has a duration of about 10 microseconds. A suitable period—about 20 microseconds—after the transmission of an ultrasonic signal from TR1, before the signal is received by TR2, S1 is opened and S2 is closed for receiving of the signal on TR2. The signal received by TR2 is transmitted to the amplifier 1 via the switch S2 and the impedances Z1, Z2 for delivery to the derivation unit on the output of the amplifier 1. When transmitting from TR2 to TR1, S2 is closed, and a suitable period after transmitting the ultrasonic signal, before it reaches TR1, S2 is broken and S1 is closed for receipt of the ultrasonic signal on TR1. This shows that the position of S1 and S2 is always the same, no matter if a given transducer is transmitting or receiving, the transducer constantly seeing a constant impedance, which substantially corresponds to the impedance of the closed switch S1, S2 and Z1.

The group running time differences in the amplifiers are eliminated, as the same amplifying element is used for both transducers, and the group running time differences in the switches S1, S2 are eliminated too, as both switches are part of the signal path, independently of the direction of transmission.

One of the advantages of the circuit shown is that, given an ideal amplifier, the virtual ground of the inverting input of the amplifier has an impedance of 0 ohm, no matter whether the connected transducer is transmitting or receiving, which means that the transducer faces a constant impedance corresponding to Z1 plus the impedance of the relevant switch S1, S2. Using non-ideal amplifiers, the impedance in the virtual ground point will have a final value, which depends on the open-loop output impedance of the amplifier, Z1, Z2, the transducer impedance and the open-loop gain of the amplifier in the frequency range in which the transducer works. Usually, the load of the transducers will be different, but the reciprocity is maintained, as the load is constant from the transmitting to the receiving mode. The usual frequency range of the transducer lies between about 40 KHz up to a few MHz.

The shown switching means S1 and S2 are in practice made as integrated C-MOS switches, but also other embodiments, for example discrete FET transistors, could be used. Common for the various embodiments is, however, the previously described and unwanted OFF-capacitance. The parasitic capacitance will typically be in the range from 0.1 to 10 pF.

Figure 2:
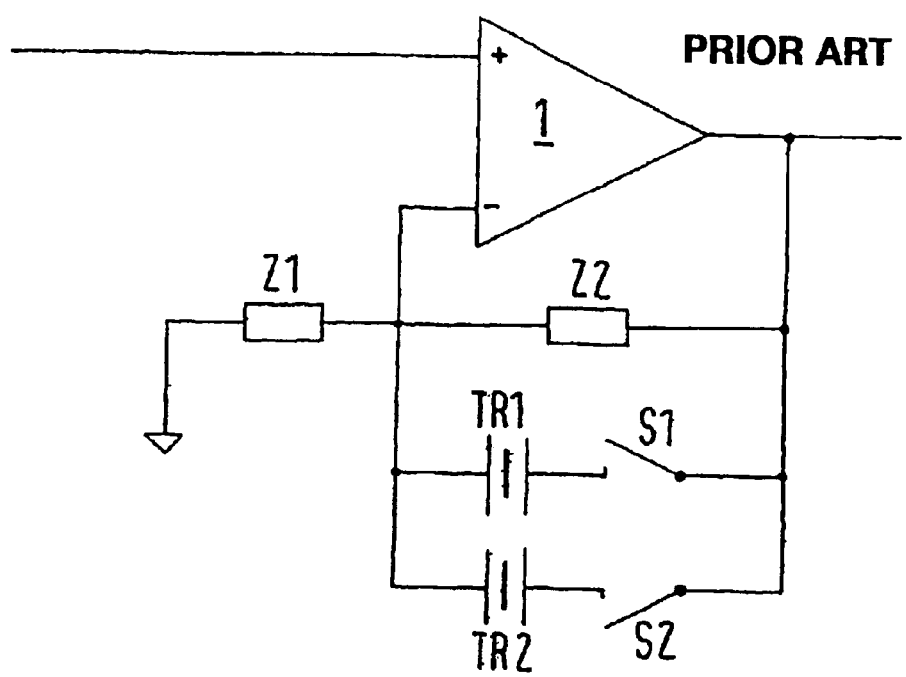
FIG. 2 a second embodiment from the state of the art, in which two ultrasonic transducers in series with switching means are connected in parallel with the feedback connection of the amplifier.
Figure 3:
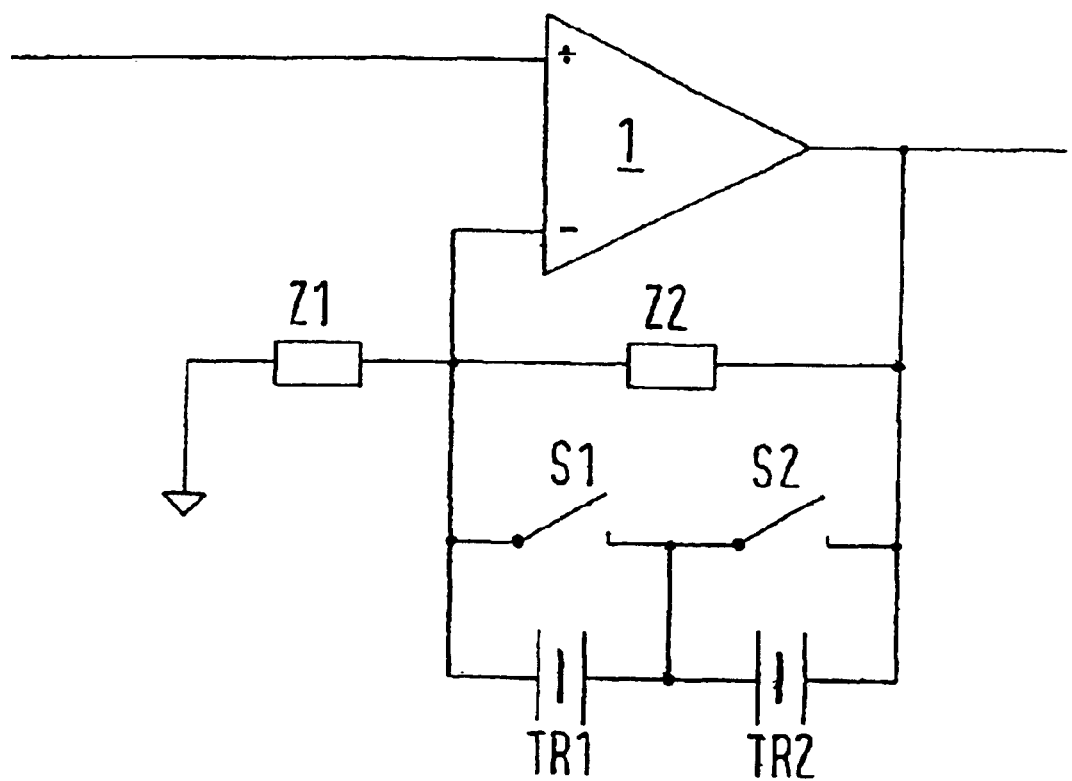
FIG. 3 a third embodiment from the state of the art, corresponding substantially to FIG. 2, the switching means being arranged in parallel with each of the transducers for short-circuiting of the non-used transducer, and the transducers being arranged in series between the first input terminal and the output terminal of the amplifier.

In relation to the embodiment shown in FIG. 1, the alternative circuit examples shown in FIGS. 2 and 3 both have the disadvantage that the transducers must be separated from the reference potential. The embodiment shown in FIG. 2 has exactly the same function as the one shown in FIG. 1, as the demands on the switches S1, S2 are the same for both circuits, namely a moderate resistance when the switch is closed and a large damping when the switch is open. The alternative shown in FIG. 3 is more difficult to realise in practice, as it requires the resistance of the switches in the closed position to be substantially lower than the transducer impedances to avoid cross talk. As the transducer impedances are typically in the range below a few hundred ohms, this may be a problem which could be solved, however, by inserting serial resistors in each transducer branch.

Even though the transducers in the figures are shown as pure transducer crystals, they are of course understood to potentially include passive serial and parallel impedances and possible signal transformers for galvanic separation. Further, the circuits are only shown with two transducers, in practice; however, from 2 to N transducers are possible to meet the requirements of measuring pipes with several tracks.

Figure 4:
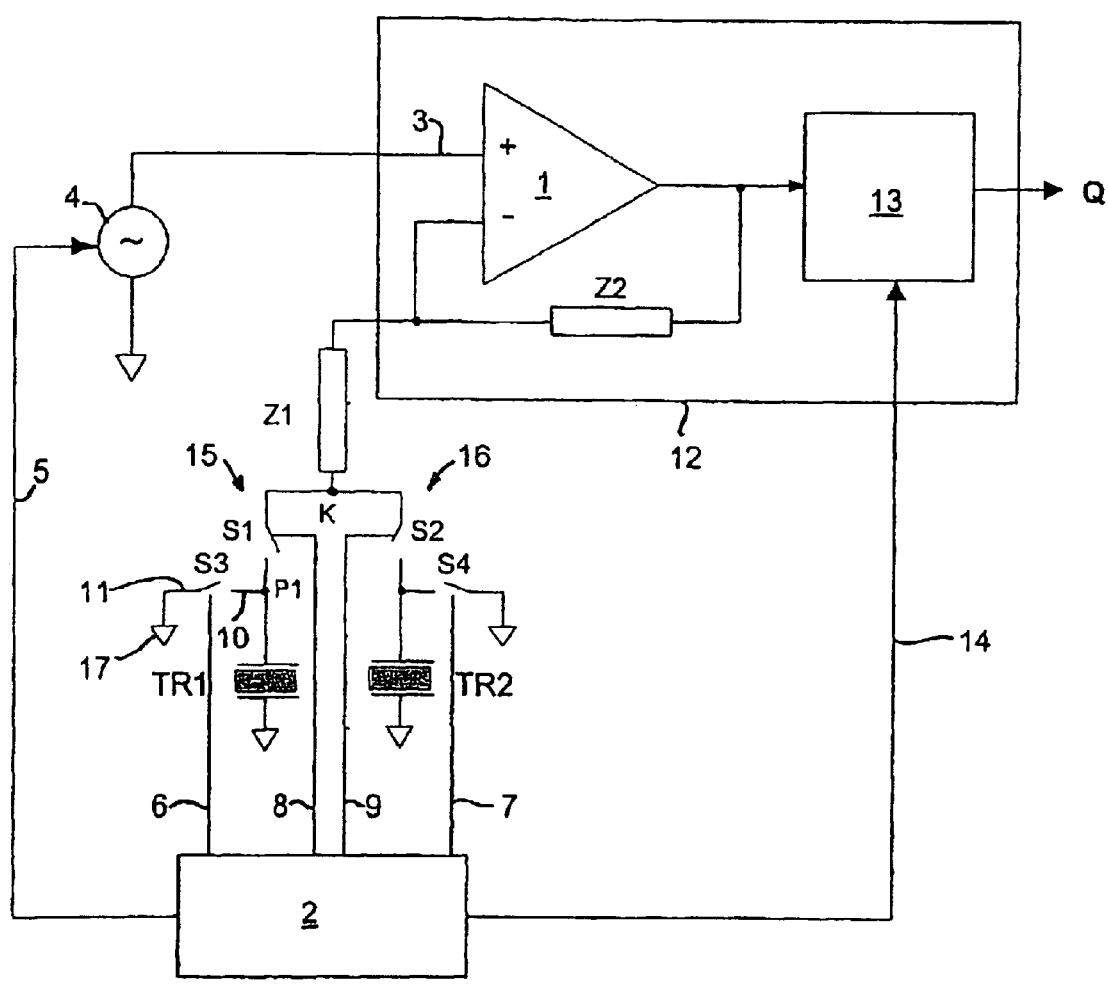
FIG. 4 a first embodiment of the invention, in which the switches are connected in parallel with the ultrasonic transducers. The figure also shows the control device and the derivation unit.

FIG. 4 shows a first embodiment of the invention. In relation to FIG. 1, two short circuit switches S3 and S4 have been added to the circuit. Like the other switches, these switches are advantageously made as CMOS switches. S3 is connected with its first pole 10 between the switching means S1 and the transducer TR1 in the point P1. The point P1 is the connection point with a conductor carrying both transmitting signals and receiving signals to and from the transducer. The short circuit switch is electrically connected with its other pole 11 to a reference potential, preferably ground. The term "pole" here means terminal. Via the lines 6 and 7, a control device 2 controls the opening and closing times for the switches, the control device 2 being, via a control line 5, connected to the generator 4. This generator 4 sends an approximately sine-shaped 1 MHz signal into the amplifier 1 on the input 3. The amplifier 1 is here shown as part of a derivation unit 12, which calculates the magnitude of the flow Q on the basis of the transit times determined by means of the ultrasonic signals and calculation unit 13, not described in detail. The control device synchronizes via connection 14. As described above, the signal is led through Z2 and Z1 to TR1, as S1 is closed and S2 is open. S1 is kept closed by the control device for a well-defined time period, after which it is opened and S2 is closed. Simultaneously, when S1 is opened, short circuit switch S3 is closed, so that the hampering generator voltage from TR1 can be decoupled to ground.

The procedure described above repeats itself on the opposite side with the switching means S2 and short circuit switch S4. The circuit TR1, S1 and S3 can be regarded as a first circuit arrangement consisting a first series connection 15 comprising S1 and TR1, whereas TR2 and S2 make up a second series connection 16 in a second circuit arrangement.

Using S3 and S4 in the circuit arrangements and controlling them as described above will break the unwanted electrical signal coupling from TR1 through the parasitic capacitance via S1 and on to the node K (FIG. 4), where the falsified signal is added to the signal from the generator 4, when TR2 is in the transmitting mode. The resulting signal causes a phase displacement of the ultrasonic signal generated by TR2, and thus a time displacement in relation to the actual time difference between the upstream and the downstream ultrasonic signals.

The switching means S1 is here shown as a single switch, but in practice it will be advantageous to use two series connected switches with a third switch connected with its one pole to the connecting line of the two switches and its other pole connected to ground. In other words, the third switch will be the short circuit switch S3. Today, such T-switches in one housing are commercially available. The advantage of this design is that the damping of the unwanted signal is substantially improved, as the signal now has to pass two OFF-capacitances, having between them a decoupling to ground.

The reference point 17 for S3 and S4 is actual ground or virtual ground, but could also be a direct voltage. In order to disconnect direct voltages, a capacitor can be inserted in series with S3.

The derivation unit 12 is shown to include one single amplifier, but could in principle also include two amplifiers, one acting as signal transmitter and the other as ultrasonic signal receiver, the output of the transmitter being electrically connected to the input of the receiver. The two series connections of switching means and ultrasonic transducer will then be connected to the output of the transmitter, which is at the same time the input of the receiver.

FIG. 7 shows a sequential diagram of the positions of switching means and short circuit switches for the design shown in FIG. 4. The control device signal to the generator 4 is shown in FIG. 7a, and at the time t0 it turns on the generator, which transmits until the time t1, a period that can vary between 0.5 and 200 μs. During this period S1 is open (ON). At the time t2, S1 is closed, for example 20 μs after stopping the generator, and at the same time, as shown in FIG. 7d, S3 will be closed by the control device in order to stop the oscillations of ultrasonic transducer TR1 as quickly as possible. FIG. 7e shows the corresponding course for S4. It is also shown that the switching means S1 and the short circuit switch S4 follow the same sequence.

Figure 5:
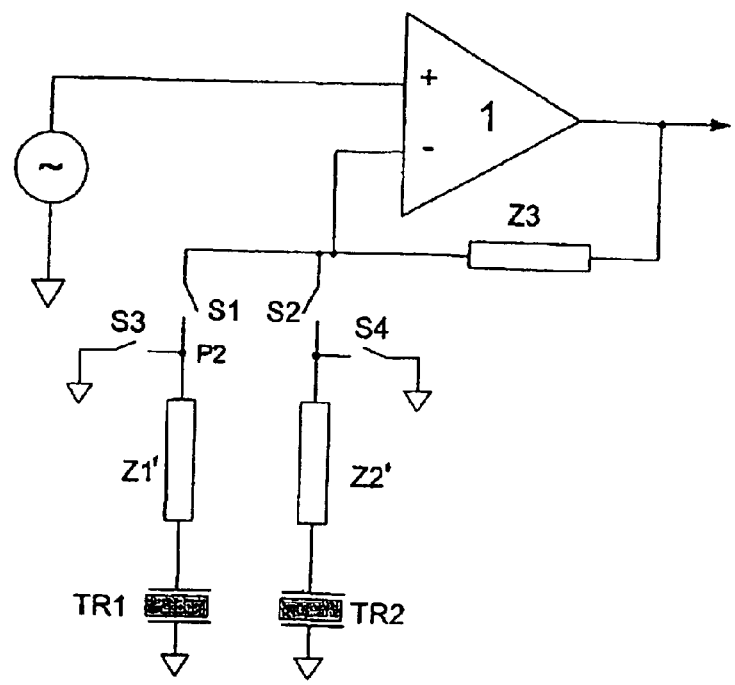
FIG. 5 a second embodiment of the invention, in which each short circuit contact is connected in parallel with a series connection comprising a switching means, an impedance and an ultrasonic transducer.

FIG. 5 shows an alternative embodiment of FIG. 4, as the impedance Z1 is divided into two impedances, Z1' and Z2'. Now, the short circuit switch S3 is not connected between Z1' and TR1, but is connected above Z1' between Z' and the switching means S1. The advantage of this design is that the ringing of the transducer will decay faster, if the transducer faces a suitably chosen impedance. Usually, the impedances will be ohmic resistors, and in this embodiment they will have a size of 100 ohms for Z1' and Z2' and 200 ohms for Z3. The impedances Z1' and Z2' can be discrete components, but can also be regarded as part of the inherent impedance of the ultrasonic transducer.

Figure 6:
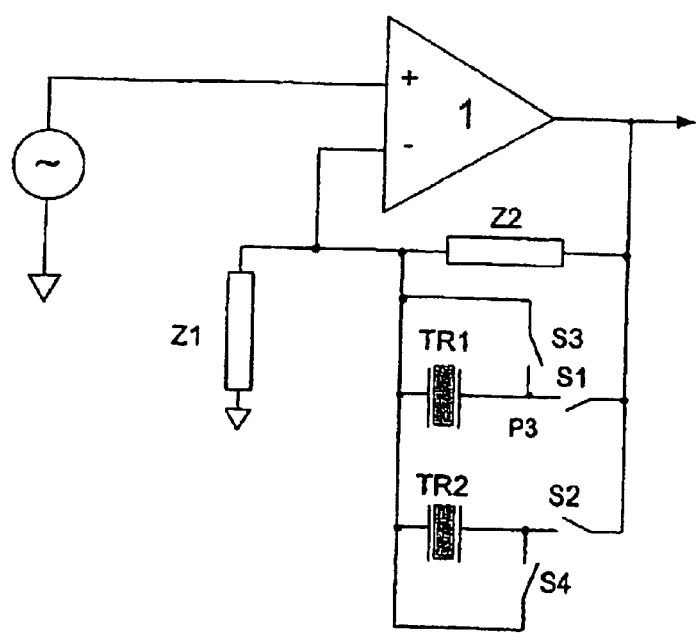
FIG. 6 a third embodiment of the invention, in which the short circuit switches are connected in parallel with the ultrasonic transducers to virtual ground on an amplifier.

FIG. 6 shows the series connections of switching means and transducer arranged in parallel with the feedback impedance Z2, and the short circuit switches S3 and S4 arranged in parallel across TR1 and TR2 with connection to the virtual ground of the amplifier.

Also in the circuit shown in FIG. 3, a short circuit switch can be inserted by inserting a first switch in series with TR1 and a second switch in series with TR2 (the switches are not shown in the figure). Here, S1 and TR2 can be regarded as a first circuit arrangement and TR1 and S2 as a second one. If S1 is closed and leads the generator signal through TR2, the non-shown switch in series with TR1 is open, thus blocking the signal path for TR1.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A transmitting and receiving circuit for an ultrasonic flowmeter, comprising:
    a signal generator;
    at least two circuit arrangements, each comprising a switching means, an ultrasonic transducer and a short circuit switch, signals from the generator being supplied to each of the ultrasonic transducers via the switching means;
    an amplifier receiving on a first input upstream and downstream ultrasonic signals and on a second input the generator signals;
    a negative feedback impedance connected between an output of the amplifier and the first input of the amplifier; and
    a second impedance connected with the circuit arrangements, and an electrical conductor connected to the short circuit switches and carrying both transmitting signals and receiving signals.

2. The transmitting and receiving circuit according to claim 1, wherein the switching means and the ultrasonic transducer in a first of the circuit arrangements form a first series connection and the switching means and the ultrasonic transducer in a second of the circuit arrangements form a second series connection.

3. The transmitting and receiving circuit according to claim 2, wherein a first pole on a first of the short circuit switches is electrically connected with the first series connection, and a first pole on a second of the short circuit switches is electrically connected with the second series connection, and that second poles of the short circuit switches are electrically connected to a reference potential.

4. The transmitting and receiving circuit according to claim 3, wherein the first pole of one of the short circuit switches is electrically connected to one pole of one of the switching means.

5. The transmitting and receiving circuit according to claim 2, wherein the first and the second series connections are electrically connected with a free end of the second impedance.

6. The transmitting and receiving circuit according to claim 3, wherein the first and the second series connections are electrically connected with a free end of the second impedance, and wherein the first pole of at least one of the short circuit switches is electrically connected between the switching means and the transducer of one of the circuit arrangements.

7. The transmitting and receiving circuit according to claim 2, wherein the first and the second series connections are connected in parallel with the negative feedback impedance.

8. The transmitting and receiving circuit according to claim 3, wherein the first and the second series connections are connected in parallel with the negative feedback impedance, and wherein the first pole of at least one of the short circuit switches is electrically connected between the switching means and the transducer of one of the circuit arrangements.

9. The transmitting and receiving circuit according to claim 5, wherein the second impedance comprises two series impedances, one series impedance being inserted between the ultrasonic transducer and the switching means of the first series connection, and the other series impedance being inserted between the ultrasonic transducer and the switching means of the second series connection.

10. The transmitting and receiving circuit according to claim 9, wherein at least a first pole of one of the short circuit switches is electrically connected between one of the switching means and a respective one of the series impedances.

11. The transmitting and receiving circuit according to claim 1, wherein at least one of the switching means consists essentially of three switches, two of the switches being arranged in series with each other, the third of the switches functioning as a decoupling switch and being connected between a common connecting point of the two switches and a reference potential.

12. The transmitting and receiving circuit according to claim 1, wherein a reference potential for the short circuit switches is a direct voltage or a reference having ground potential or virtual ground potential.

13. The transmitting and receiving circuit according to claim 1, further comprising at least one impedance arranged in series with at least one of the short circuit switches.

14. The transmitting and receiving circuit according to claim 13, wherein the at least one impedance comprises a capacitor.

15. The transmitting and receiving circuit according to claim 1, wherein the two ultrasonic transducers form a first series connection, and the two switching means from a second series connection, the two series connections being arranged in parallel and electrically connected with each other in a midpoint of the first series connection and in a midpoint of the second series connection, the short circuit switches being arranged, respectively, in series with the two ultrasonic transducers.

16. The transmitting and receiving circuit according to claim 1, further comprising a control device controlling opening and closing times of the switching means and of the short circuit switches.

17. A transceiver circuit for an ultrasonic flowmeter, comprising:
    a signal generator;
    a detection unit comprising an amplifier receiving generator signals from the signal generator at a first input;
    at least two ultrasonic transducers, comprising a receiver transducer and a transmission transducer;
    a switching arrangement alternately connecting each of the ultrasonic transducers with a second input of the amplifier; and
    at least two short circuit switches inserted respectively between the amplifier and a respective one of the two ultrasonic transducers, the short circuit switches alternately opening and closing in accordance with the alternate connecting of the switching arrangement.

* * * * *